(12) United States Patent
Lim et al.

(10) Patent No.: US 9,631,091 B2
(45) Date of Patent: *Apr. 25, 2017

(54) POLY (ARYLENE ETHER) FLAME RETARDANT RESIN COMPOSITION AND NON-CROSSLINKED FLAME RETARDANT CABLE

(71) Applicant: LG CHEM, LTD., Seoul (KR)

(72) Inventors: Sung Hwan Lim, Daejeon (KR); Nam Jib Park, Daejeon (KR); Sang Ho Lee, Daejeon (KR); Soo Min Lee, Daejeon (KR); Jong Kuk Choi, Daejeon (KR); Sang Wook Na, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,596

(22) PCT Filed: Dec. 10, 2014

(86) PCT No.: PCT/KR2014/012118
§ 371 (c)(1),
(2) Date: Aug. 31, 2015

(87) PCT Pub. No.: WO2015/088240
PCT Pub. Date: Jun. 18, 2015

(65) Prior Publication Data
US 2016/0017146 A1    Jan. 21, 2016

(30) Foreign Application Priority Data
Dec. 10, 2013 (KR) .................. 10-2013-0152877

(51) Int. Cl.
C08L 81/04 (2006.01)
C08L 71/12 (2006.01)
C08K 5/523 (2006.01)

(52) U.S. Cl.
CPC ............. C08L 81/04 (2013.01); C08L 71/12 (2013.01); C08K 5/523 (2013.01); C08L 2201/02 (2013.01); C08L 2203/202 (2013.01); C08L 2207/04 (2013.01)

(58) Field of Classification Search
CPC ........................................ C08L 81/04
USPC ........................................ 524/133
See application file for complete search history.

(56) References Cited

U.S. PATENT DOCUMENTS

| | | | |
|---|---|---|---|
| 7,799,854 B2 * | 9/2010 | Kosaka | C08L 23/04 524/100 |
| 2006/0134416 A1 * | 6/2006 | Kubo | H01B 3/427 428/375 |
| 2007/0261878 A1 | 11/2007 | Kosaka et al. | |
| 2009/0247667 A1 * | 10/2009 | Yao | C08L 67/02 523/124 |
| 2011/0040038 A1 * | 2/2011 | Arai | C08F 210/02 525/185 |
| 2011/0266024 A1 | 11/2011 | Qiu et al. | |
| 2012/0037396 A1 | 2/2012 | Gu | |
| 2013/0303704 A1 * | 11/2013 | Jeon | C08J 5/18 525/321 |

FOREIGN PATENT DOCUMENTS

| | | |
|---|---|---|
| CN | 1961042 A | 5/2007 |
| CN | 101679740 A | 3/2010 |
| CN | 102414274 A | 4/2012 |
| JP | 2004-161929 A | 6/2004 |
| KR | 10-2010-0017356 A | 2/2010 |
| KR | 10-2013-0121152 A | 11/2013 |
| KR | 10-2013-0077468 A | 11/2014 |
| WO | 2005/097900 A1 | 10/2005 |
| WO | WO 2010/030478 | * 3/2010 |

* cited by examiner

Primary Examiner — Doris Lee
(74) Attorney, Agent, or Firm — Dentons US LLP

(57) ABSTRACT

Disclosed are a flame retardant poly(arylene ether) resin composition and a flame retardant non-crosslinked cable. According to the present invention, provided are a flame retardant poly(arylene ether) resin composition to provide flexibility, flame retardancy, productivity, extrusion processability, etc. while maintaining heat resistance, and a flame retardant non-crosslinked cable manufactured using the composition.

9 Claims, No Drawings

POLY (ARYLENE ETHER) FLAME RETARDANT RESIN COMPOSITION AND NON-CROSSLINKED FLAME RETARDANT CABLE

This application is a National Stage Entry of International Application No. PCT/KR2014/012118, filed Dec. 10, 2014, and claims the benefit of the priority to Korean Application No. 10-2013-0152877, filed Dec. 10, 2013, both of which are incorporated by reference in their entirety for all purposes as if fully set forth herein.

TECHNICAL FIELD

The present invention relates to a flame retardant poly (arylene ether) resin composition and a flame retardant non-crosslinked cable. More particularly, the present invention relates to a flame retardant poly(arylene ether) resin composition comprising a poly(arylene ether) resin, a thermoplastic elastomer and a halogen-free flame retardant, the thermoplastic elastomer comprising a heat resistant olefin-based copolymer and an aromatic vinyl-based block copolymer and the halogen-free flame retardant comprising liquid phosphate and a flame retardant phosphorus-based filler, in order to provide flexibility, flame retardancy, productivity, extrusion processability, etc. while maintaining heat resistance, and a flame retardant non-crosslinked cable manufactured using the composition.

BACKGROUND ART

A poly(arylene ether) resin is an amorphous resin and has advantages such as dimensional stability, insulating properties, heat resistance and rigidity. However, when a poly (arylene ether) resin is extruded to manufacture cables, etc., properties such as flexibility, processability, etc are deteriorated.

In addition, when a poly(arylene ether) resin is used instead of a polyvinyl chloride resin used as coating resins for a long time in cable industries, heat resistance, flame retardancy, insulating properties, processability and cable productivity are not satisfactory.

In order to these problems, technologies using polypropylene in a poly(arylene ether) resin composition to compensate unsatisfactory heat resistance and inputting a flame retardant phosphorus-based filler to compensate unsatisfactory flame retardancy were suggested. However, when polypropylene is used together, effects due to addition of a flame retardant filler cannot be provided, productivity is still decreased, and flexibility is limited. Therefore, there is an urgent need for development of a flame retardant poly (arylene ether) resin composition which can address the problems.

DISCLOSURE

Technical Problem

Therefore, the present invention has been made in view of the above problems, and it is one object of the present invention to provide a flame retardant poly(arylene ether) resin composition which may provide flexibility, flame retardancy, productivity, extrusion processability, etc. while maintaining heat resistance, by using a styrene based block copolymer instead of application of a polypropylene resin, in which it is difficult to enhance effects due to addition of flame retardant filler, productivity is decreased, and flexibility is not satisfactory, conventionally used to increase heat resistance of a poly(arylene ether) resin, and by newly comprising a liquid flame retardant, and a flame retardant non-crosslinked cable manufactured using the composition.

Technical Solution

In accordance with one aspect of the present invention, provided is a flame retardant poly(arylene ether) resin composition comprising a poly(arylene ether) resin, a thermoplastic elastomer and a halogen-free flame retardant, wherein the thermoplastic elastomer comprises a heat resistant olefin-based copolymer and an aromatic vinyl-based block copolymer and the halogen-free flame retardant comprises liquid phosphate and a flame retardant phosphorus-based filler.

In accordance with another aspect of the present invention, provided is a flame retardant non-crosslinked cable molded using the composition.

Advantageous Effects

As apparent from the fore-going, the present invention advantageously provides a poly(arylene ether) resin composition which may provide flexibility, flame retardancy, productivity, extrusion processability, etc while maintaining heat resistance.

BEST MODE

Hereinafter, the present invention is described in detail.

A flame retardant poly(arylene ether) resin composition according to the present invention comprises a poly(arylene ether) resin, a thermoplastic elastomer and a halogen-free flame retardant, wherein the thermoplastic elastomer comprises a heat resistant olefin-based copolymer and an aromatic vinyl-based block copolymer and the halogen-free flame retardant comprises liquid phosphate and a flame retardant phosphorus-based filler.

In an embodiment, the intrinsic viscosity of the poly (arylene ether) resin measured under a condition of 25° C. and chloroform may be 0.30 dl/g or more, 0.30 to 0.45 dl/g or 0.36 to 0.40 dl/g.

In an embodiment, the weight-average molecular weight of the poly(arylene ether) resin may be 10000 to 100000 g/mol, 30000 to 70000 g/mol or 30000 to 50000 g/mol.

In an embodiment, the number average molecular weight of the poly(arylene ether) resin may be 1000 to 50000 g/mol, 5000 to 30000 g/mol or 10000 to 20000 g/mol.

In an embodiment, the poly(arylene ether) resin may be one or more selected from a homopolymer, a copolymer, a graft copolymer, an ionomer and a block copolymer.

In a specific embodiment, the poly(arylene ether) resin may be one or more selected from poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloromethyl)-1,4-phenylene ether), poly(2,6-di(bromomethyl)-1,4-phenylene ether), poly(2,6-diphenyl-1,4-phenylene ether), poly(2,6-dichloro-1,4-phenylene ether), poly(2,6-dibenzyl-1,4-phenylene ether) and poly(2,5-dimethyl-1,4-phenylene ether).

In an embodiment, the heat resistant olefin-based copolymer may be one or more selected from copolymers of ethylene and C2 to C10 unsaturated aliphatic hydrocarbon which may enhance flexibility and processability while maintaining a high heat resistant grade.

In a specific embodiment, the heat resistant olefin-based copolymer may have Tm of 120° C. or more, 120 to 135° C. or 120 to 125° C., and a weight-average molecular weight of 50,000 g/mol or more or 90,000 to 110,000 g/mol. In particular, the heat resistant olefin-based copolymer may be less than 50% in a kind of heat distortion test among 105° C. heat resistant grade wire tests based on UL 1581.

The aromatic vinyl-based block copolymer increases compatibility while maintaining conventional heat resistance by decreasing interfacial tension between the poly (arylene ether) resin and the heat resistant olefin-based copolymer. In an embodiment, the aromatic vinyl-based block copolymer may be one or more block copolymers selected from copolymers of an aromatic vinyl monomer and C2 to C10 unsaturated aliphatic hydrocarbon.

In an embodiment, the C2 to C10 unsaturated aliphatic hydrocarbon may be one or more selected from 1-butene, 1-pentene, 4-methyl-1-pentene, 1-hexene, 1-heptene, 1-octene, 1-decene, 1-undecene, 1-dodecene, 1-tethracene, 1-hexadecene and 1-itocene.

In a specific embodiment, the aromatic vinyl-based block copolymer may be one or more selected from styrene-ethylene/butylene-styrene (SEBS), styrene-butadiene-styrene (SBS), styrene-isoprene-styrene (SIS), styrene-ethylene/propylene-styrene (SEPS) and styrene-isobutylene-styrene (SIBS).

In another embodiment, the aromatic vinyl-based block copolymer may comprise 10% to 50% by weight of an aromatic vinyl-based monomer.

In another embodiment, the aromatic vinyl-based block copolymer may use a copolymer comprising 10 to 25% by weight of the aromatic vinyl-based monomer and a copolymer comprising 26% to 50% by weight of the aromatic vinyl-based monomer together.

When the two-type copolymers are used, the amount of the copolymer comprising 10 to 25% by weight of the aromatic vinyl-based monomer may be 1 to 15% by weight or 5 to 10% by weight a based on 100% by weight of the flame retardant poly(arylene ether) resin composition. Within the range, hardness is decreased and compatibility of poly(arylene ether) and an olefin resin is increased.

When the two-type copolymers are used, the amount of the copolymer comprising 26% to 50% by weight of the aromatic vinyl-based monomer may be 19% to 55% by weight, or 23 to 35% by weight based on 100% by weight of the flame retardant poly(arylene ether) resin composition.

Since the halogen-free flame retardant is eco-friendly, the halogen-free flame retardant may be used instead of a halogen based flame retardant.

In an embodiment, the liquid phosphate may be phosphate which is a liquid under a condition of room temperature (20° C.) and atmospheric pressure. In this case, dispersibility of poly(arylene ether) as a plasticizer may be increased.

In an embodiment, the liquid phosphate may be one or more selected from trimethyl phosphate, triethyl phosphate, triphenyl phosphate, tricresyl phosphate, trixylenyl phosphate, resorcinol bis(diphenyl phosphate), phenyl diresorcinol phosphate, bisphenol diphenyl phosphate, cresyl diphenyl phosphate, xylenyl diphenyl phosphate, phenyl di(isopropylphenyl)phosphate, triisophenyl phosphate, diphenylphosphate, resorcinol diphosphate and aromatic polyphosphate.

In an embodiment, the flame retardant phosphorus-based filler may be one or more selected from aluminium polyphosphate, melamine polyphosphate, piperazine pyrophosphate, piperazine phosphate, piperazine pyrophosphate-phosphate-zinc oxide, 2-carboxyethyl phenyl phosphinic acid, 9,10-dihydro-9-oxa-10-phosphaphenanthrene-10-oxide, 10-(2,5-dihydroxyphenyl)-9,10-dihydro-9-oxa-10-phosphaphenanthrene-10-oxide, triphenylphosphate, metal based bis(hydroxymethyl)phosphinate and melamine based phosphinate.

In an embodiment, the resin composition may comprise 15% to 60% by weight of a poly(arylene ether) resin, 1% to 20% by weight of a heat resistant olefin-based copolymer, 20% to 70% by weight of an aromatic vinyl-based block copolymer, 1% to 10% by weight of liquid phosphate, and 4% to 20% by weight of a flame retardant phosphorus-based filler based on 100% by weight of a mixture of a poly (arylene ether) resin, a heat resistant olefin-based copolymer, an aromatic vinyl-based block copolymer, liquid phosphate and a flame retardant phosphorus-based filler. Within this range, flexibility, flame retardancy, productivity, and extrusion processability may be provided while maintaining heat resistance.

In another embodiment, 20 to 40% by weight of the poly(arylene ether) resin, 5 to 15% by weight of the heat resistant olefin-based copolymer, 25 to 48% by weight of the aromatic vinyl-based block copolymer, 5 to 10% by weight of the liquid phosphate and 10 to 18% by weight of the flame retardant phosphorus-based filler are comprised based on 100% by weight of a mixture of the poly(arylene ether) resin, the heat resistant olefin-based copolymer, the aromatic vinyl-based block copolymer, the liquid phosphate and the flame retardant phosphorus-based filler. Within this range, flexibility, flame retardancy, productivity, extrusion processability, etc. are provided while maintaining heat resistance.

The flame retardant poly(arylene ether) resin composition may further comprise an insulator. In particular, when insulating oil such as mineral oil (paraffin oil) is used, processability before extrusion is enhanced, and thus, a melting index (liquidity) is increased. In addition, costs may be saved, and, when hardness, etc. is measured, flexibility may be provided to a prepared cable.

The insulator may be comprised in an amount of 0.1 to 10 parts by weight, 1 to 8 parts by weight, or 3 to 6 parts by weight based on 100 parts by weight of the poly(arylene ether) resin composition.

As needed, the resin composition may further comprise one or more additives selected from a lubricant, an antioxidant, a light stabilizer, a chain extender, a catalyst, a releasing agent, a pigment, a dye, an antistatic agent, an antibacterial agent, a processing aid, a metal inactivator, a smoke suppressant, a fluorine based anti-dripping agent, an inorganic filler, glass fiber, an anti-friction agent, an anti-wear agent and a coupling agent. In an embodiment, the additive may be used within the range that properties of the flame retardant poly(arylene ether) resin composition according to the present invention are not negatively affected.

The flame retardant poly(arylene ether) resin composition according to the present invention is first-mixed, selectively with the additive, in a mixer or a super mixer. Subsequently, melt-kneading is carried out at 200° C. to 300° C. using one of a variety of mixing and processing devices such as a twin-screw extruder, a single-screw extruder, a roll mill, a kneader or a banbury mixer, and then a pellet is obtained through extrusion-processing. The obtained pellet is sufficiently dried using a dehumidifying dryer or a hot air dryer. Subsequently, injection-processing may be carried out.

According to the present invention, a flame retardant non-crosslinked cable is molded using the flame retardant poly(arylene ether) resin composition, and the flame retardant non-crosslinked cable properly exhibits cable extrusion processability, liquidity, tensile strength, tensile elongation, heat resistance and cable-standard flame retardancy.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

EXAMPLE

Examples 1 to 2

Ingredients summarized in Table 1 below were input to a super mixer in amounts disclosed in the table and mixed. Subsequently, the mixture was melt-kneaded at 200 to 290° C. using a twin-screw extruder, and then, a pellet was obtained through extrusion-processing using pelletizer. The pellet was dried at 80° C. for four or more hours, and then, injection-molded. After standing at room temperature for one day, a specimen extruded into a cable was used to test properties thereof. For reference, a cable extruder was 45 φ and extrusion was carried out in a process line of SHIN-WHA.

Comparative Examples 1 to 4

A specimen was prepared in the same manner as in Example 1, except that ingredients summarized in Table 1 below were used in amounts as disclosed in the table.

Poly(Arylene Ether) Resin (PPE):
MEP 100F (MEP having a weight-average molecular weight of 31,800 g/mol, a specific gravity of 1.06 g/cm$^3$ and a viscosity of 0.38±0.02 dl/g).

Aromatic Vinyl-Based Block Copolymer 1 (SBC1):
Kraton SEBS G 1657 (linear triblock copolymer having properties such as st.13%, a melting index (230° C./5 kg) of 22 g/10 minutes, a hardness of 47 A, an elongation of 750% upon fracture and a specific gravity of 0.9 g/cm3, and composed of styrene and ethylene/butylene).

Aromatic Vinyl-Based Block Copolymer 2 (SBC2):
Kraton SEBS A 1536 (linear triblock copolymer having properties such as st.42%, a melting index (260° C./5 kg) of 7 g/10 minutes, a hardness of 65 A and elongation of 600% or more upon fracture, and composed of styrene and ethylene/butylene).

Heat Resistant Olefin Block Copolymer (OBC1):
LG Chem HT 170 (density: 0.87-0.88 g/cm3, melting index: 1-1.4 g/10 minutes, weight-average molecular weight: 90,000 to 11,000 g/mol, Tm: 123° C., Tg: −53° C., hardness: 77 A, tensile strength upon fracture: 11 MPa and elongation upon fracture: 800%).

Olefin Block Copolymer (OBC2):
LG Chem LC 180 (density: 0.88-0.89 g/cm3, melting index: 1.2 g/10 minutes, Tm: 73° C., Tg: −45° C., hardness: 86 A, tensile strength upon fracture: 28 MPa and elongation upon fracture: 800%).

Polypropylene Resin (PP):
GS Caltex M910 (melting index (230° C./2.16 kg): 0.6 g/10 minutes, specific gravity: 0.9 g/cm$^3$, surface hardness: 80 R-scale, Izod impact strength: >50 kg·cm/cm, flexural modulus: 11000 kg/cm$^2$, heat deflection temperature: 112° C., and elongation upon fracture: >500%).

Liquid Phosphate (BDP):
Adeka FP-600 (phosphorus content: 8.9%, specific gravity: 1.258 g/cm$^3$, viscosity: >20,000 mPa·S).

Phosphorus Based Filler 1 (FR 1):
Clariant OP 1230 (specific gravity: 1.35 g/cm$^3$, average particle size: 20-40 μm, phosphorus content: 22.3-24%, and DSC 2% decomposition temperature: >350° C.).

Phosphorus Based Filler 2 (FR 2):
DOOBON NONFLA 601 (average particle size: 3.5-4.5 μm, DSC 2% decomposition temperature: >350° C., nitrogen content: 40-44%, and phosphorus content 14-17%).

Insulating Oil (Mineral Oil):
GS Caltex kixx 150N (specific gravity: 0.85-0.87 g/cm$^3$, viscosity at 40° C.: 26-40 mm2/s, volatile point: 226° C., and weight-average molecular weight: 407.8 g/mol).

TABLE 1

| Classification | Example 1 | Example 2 | Comparative Example 1 | Comparative Example 2 | Comparative Example 3 | Comparative Example 4 |
|---|---|---|---|---|---|---|
| PPE | 30 | 30 | 30 | 30 | 30 | 30 |
| SBC1 | 7 | 7 | 10 | 7 | 10 | 7 |
| SBC2 | 26 | 26 | 28 | 26 | 26 | 26 |
| OBC1 | 10 | 10 | 10 | 20 | — | — |
| OBC2 | — | — | — | — | — | 10 |
| PP | — | — | 10 | — | 10 | — |
| BDP | 10 | 5 | — | — | 5 | 5 |
| FR1 | 14 | 12 | 12 | 12 | 12 | 12 |
| FR2 | — | 4 | 4 | 7 | 4 | 4 |
| Mineral oil (parts by weight of*) | 5 | 5 | 5 | — | 5 | 5 |

*"Parts by weight" is based on 100 parts by weight of PPE + SBC1 + SBC2 + OBC1 + OBC2 + PP + BDP + FR1 + FR2.

Test Example

Properties of the cable specimens manufactured using the flame retardant poly(arylene ether) resin composition according to Examples 1 to 2 and Comparative Examples 1 to 4 were measured according to a method below. Results are summarized in Table 3 below.

[Property Measurement]

Cable Extrusion-Processability (Appearance Evaluation):
Was evaluated with the naked eye according to a method of UL 1581. In particular, cable surfaces observed using a microscope and productivity upon mass production of cables were considered and evaluated according to Table 2 below.

TABLE 2

| Classification | ⊚ | ○ | Δ | X |
|---|---|---|---|---|
| Cable surface observed with microscope | Smooth surface | Smooth surface | Cable surface filler is observed | Cable surface filler is observed |
| Flux | >500 m/min | <500 m/min | >100 m/min | <100 m/min |

Liquidity (MI, 250° C./2.16 kg):
A material was stood under a load of 10 kg at 250° C. for five minutes, and then liquidity thereof was measured. The other measurements were carried out based on an ASTM D1238 test standard.

Room-Temperature Tensile Strength and Elongation:
Measurement was carried out according to a method of UL 1581.

Tensile Strength and Elongation Ratios Changed after Aging (Maintenance Ratio after Heating):

a standard chamber was stood under a condition of 136° C./168 hours described in UL 1581 and then a stabilizing process was carried out at room temperature. Subsequently, measured tensile strength and elongation values were respectively divided by room-temperature tensile strength and elongation values, and the divided values were represented as a percentage.

Hardness (Shore A):

Measured according to ASTM D 2240.

Flame Retardancy (VW-1):

Measured According to UL 1581 as a cable flame-retardant standard.

TABLE 3

| Classification | Example 1 | Example 2 | Comparative Example 1 | Comparative Example 2 | Comparative Example 3 | Comparative Example 4 |
|---|---|---|---|---|---|---|
| Cable extrusion processability | ○ | ⊚ | X | X | Δ | X |
| MI | >100 | >20 | >20 | >10 | >10 | >20 |
| Room-temperature tensile strength | >150 | >200 | >300 | >100 | >200 | >200 |
| Room-temperature tensile elongation | >250 | >250 | >150 | >150 | >100 | >100 |
| Tensile strength change ratio after aging | <30 | <10 | <30 | <30 | <30 | <30 |
| Tensile elongation change ratio after aging | <40 | <40 | <30 | <50 | <30 | <50 |
| Hardness (Shore A) | 92 | 87 | 93 | 86 | 96 | 94 |
| VW-1 | Pass | Pass | Fail | Fail | Pass | Pass |

As shown in Table 3, in the cases of the cable specimens prepared using the flame retardant poly(arylene ether) resin composition according to the present invention (Examples 1 to 2), cable extrusion processability is enhanced and cable flame-retardant standard VW-1 is passed, when compared with Comparative Example 1 in which a heat resistant olefin block copolymer and a polypropylene resin are used together, liquid phosphate is not used, and a flame retardant phosphorus-based filler is used.

In addition, in the cases of the cable specimen prepared using the flame retardant poly(arylene ether) resin composition according to the present invention (Examples 1 to 2), cable extrusion processability, liquidity, tensile strength, tensile elongation, tensile elongation change after aging and shore hardness are also enhanced and cable flame-retardant standard VW-1 is passed, when compared with Comparative Example 2 in which polypropylene and Mineral oil are not used.

In addition, in the cases of the cable specimens prepared using the flame retardant poly(arylene ether) resin composition according to the present invention (Examples 1 to 2), cable extrusion processability, liquidity, and tensile elongation are enhanced, when compared with Comparative Example 3 in which the polypropylene resin is used instead of the heat resistant olefin block copolymer.

In particular, in the cases of the cable specimens prepared using the flame retardant poly(arylene ether) resin composition according to the present invention (Examples 1 to 2), cable extrusion processability is dramatically enhanced, when compared with Comparative Example 4 in which a different-grade olefin block copolymer instead of the heat resistant olefin block copolymer is used and a polypropylene resin is not used.

According to the present, a cable prepared by using a heat resistant olefin-based block copolymer, as a styrene based block copolymer and a hybrid block copolymer, instead of a conventionally used polypropylene resin, in regard to a poly(arylene ether) resin composition used in preparation of a cable, and by additionally comprising liquid phosphate, as a hybrid phosphorus based flame retardant, to a flame retardant filler exhibits enhanced flexibility, flame retardancy, productivity, extrusion processability, etc. not affecting conventional heat resistance.

What is claimed is:

1. A flame retardant poly(arylene ether) resin composition comprising:

20% to 40% by weight of a poly(arylene ether) resin,

5% to 15% by weight of a heat resistant olefin-based copolymer,

5% to 10% by weight of an aromatic vinyl-based block copolymer comprising 10 to 25% by weight of an aromatic vinyl-based monomer, 23% to 35% by weight of an aromatic vinyl-based block copolymer comprising 26% to 50% by weight of an aromatic vinyl-based monomer, 5% to 10% by weight of liquid phosphate, 14% to 18% by weight of a flame retardant phosphorus-based filler, and 3 to 6 parts by weight of a mineral oil as an insulator based on the 100 parts by weight of the poly(arylene ether) resin, the heat resistant olefin-based copolymer, the aromatic vinyl-based block copolymer comprising 10 to 25% by weight of an aromatic vinyl-based monomer, the aromatic vinyl-based block copolymer comprising 26% to 50% by weight of an aromatic vinyl-based monomer, the liquid phosphate and the flame retardant phosphorus-based filler, wherein the heat resistant olefin-based copolymer is one or more selected from copolymers of ethylene and C2 to C10 unsaturated aliphatic hydrocarbon, wherein the heat resistant olefin-based copolymer has a Tm of 120° C. to 125° C., and has a weight-average molecular weight of 90,000 g/mol to 110,000 g/mol, and wherein the flame retardant phosphorus-based filler comprises aluminum polyphosphate.

2. The flame retardant poly(arylene ether) resin composition according to claim 1, wherein the poly(arylene ether) resin is one or more selected from poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloromethyl)-1,4-phenylene ether), poly(2,6-di(bromomethyl)-1,4-phenylene ether), poly(2,6-diphenyl-1,4-phenylene ether), poly(2,6-dichloro-1,4-phenylene ether), poly(2,6-dibenzyl-1,4-phenylene ether) and poly(2,5-dimethyl-1,4-phenylene ether).

3. The flame retardant poly(arylene ether) resin composition according to claim 1, wherein the C2 to C10 unsaturated aliphatic hydrocarbon is one or more selected from 1-butene, 1-pentene, 4-methyl-1-pentene, 1-hexene, 1-heptene, 1-octene, 1-decene, 1-undecene, 1-dodecene, 1-tethracene, 1-hexadecene and 1-itocene.

4. The flame retardant poly(arylene ether) resin composition according to claim 1, wherein the liquid phosphate is one or more selected from trimethyl phosphate, triethyl phosphate, triphenyl phosphate, tricresyl phosphate, trixylenyl phosphate, resorcinol bis(diphenyl phosphate), phenyl diresorcinol phosphate, bisphenol diphenyl phosphate, cresyl diphenyl phosphate, xylenyl diphenyl phosphate, phenyl di(isopropylphenyl)phosphate, triisophenyl phosphate, diphenylphosphate, resorcinol diphosphate and aromatic polyphosphate.

5. The flame retardant poly(arylene ether) resin composition according to claim 1, wherein the flame retardant phosphorus-based filler further comprises one or more selected from the group consisting of melamine polyphosphate, piperazine pyrophosphate, piperazine phosphate, piperazine pyrophosphate-phosphate-zinc oxide, 2-carboxyethyl phenyl phosphinic acid, 9,10-dihydro-9-oxa-10-phosphaphenanthrene-10-oxide, 10-(2,5-dihydroxyphenyl)-9,10-dihydro-9-oxa-10-phosphaphenanthrene-10-oxide, triphenylphosphate, metal based bis(hydroxymethyl)phosphinate and melamine based phosphinate.

6. The flame retardant poly(arylene ether) resin composition according to claim 1, wherein the resin composition comprises one or more additives selected from a lubricant, an antioxidant, a light stabilizer, a chain extender, a catalyst, a releasing agent, a pigment, a dye, an antistatic agent, an antibacterial agent, a processing aid, a metal inactivator, a smoke suppressant, a fluorine based anti-dripping agent, an inorganic filler, glass fiber, an anti-friction agent, an anti-wear agent and a coupling agent.

7. The flame retardant poly(arylene ether) resin composition according to claim 1, wherein each of the aromatic vinyl-based block copolymer comprising 10 to 25% by weight of an aromatic vinyl-based monomer and the aromatic vinyl-based block copolymer comprising 26% to 50% by weight of an aromatic vinyl-based monomer is one or more block copolymers selected from copolymers of an aromatic vinyl monomer and C2 to C10 unsaturated aliphatic hydrocarbon.

8. The flame retardant poly(arylene ether) resin composition according to claim 7, wherein each of the aromatic vinyl-based block copolymer comprising 10 to 25% by weight of an aromatic vinyl-based monomer and the aromatic vinyl-based block copolymer comprising 26% to 50% by weight of an aromatic vinyl-based monomer is one or more block copolymers selected from the group consisting of styrene-ethylene/butylene-styrene (SEBS), styrene-butadiene-styrene (SBS), styrene-isoprene-styrene (SIS), styrene-ethylene/propylene-styrene (SEPS) and styrene-isobutylene-styrene (SIBS) block copolymers.

9. A flame retardant non-crosslinked cable molded using a flame retardant poly(arylene ether) resin composition according to claim 1.

\* \* \* \* \*